R. W. GOODHART.
SECTIONAL PNEUMATIC TIRE.
APPLICATION FILED MAR. 1, 1920.
1,364,930.
Patented Jan. 11, 1921.
2 SHEETS—SHEET 1.
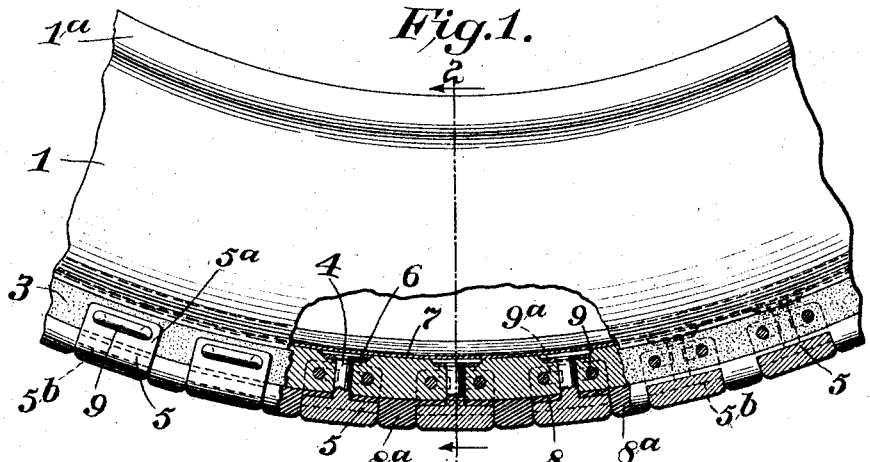
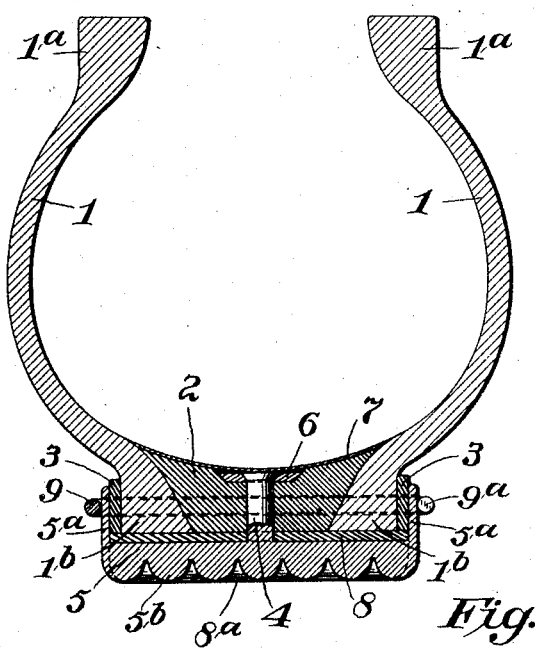
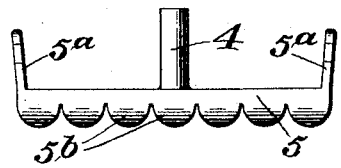
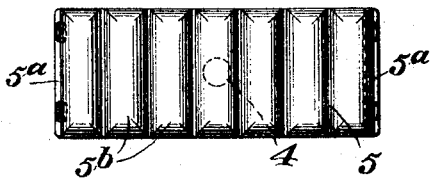
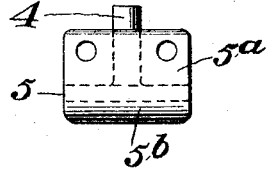
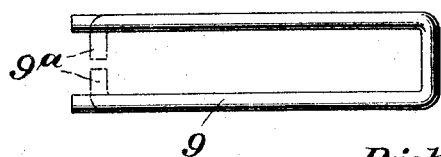
Inventor:
Richard W. Goodhart,
By Spear Middleton Donaldson
& Hall
Attorneys R. W. GOODHART.
SECTIONAL PNEUMATIC TIRE.
APPLICATION FILED MAR. 1, 1920.
1,364,930.
Patented Jan. 11, 1921.
2 SHEETS—SHEET 2.
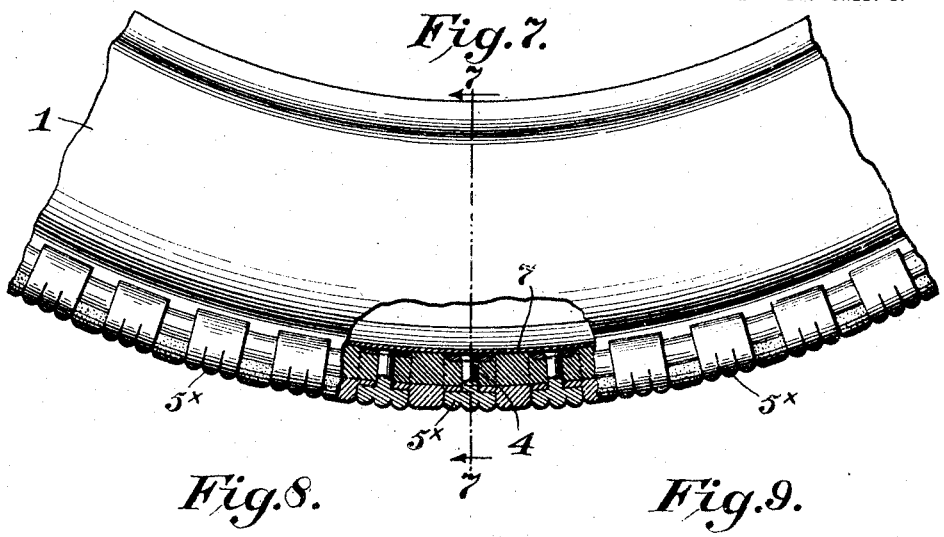
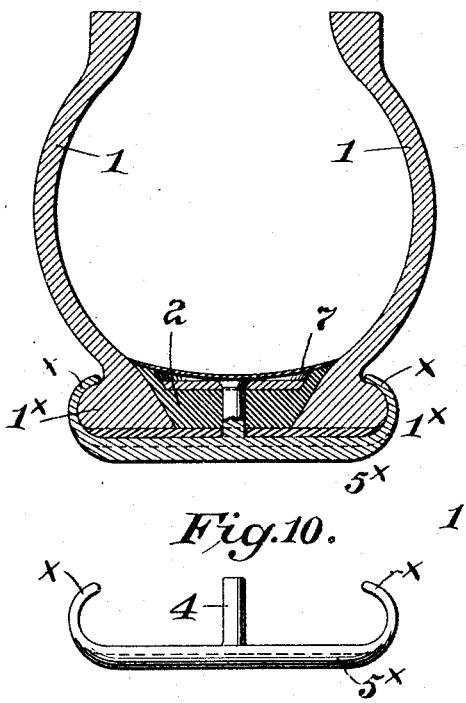
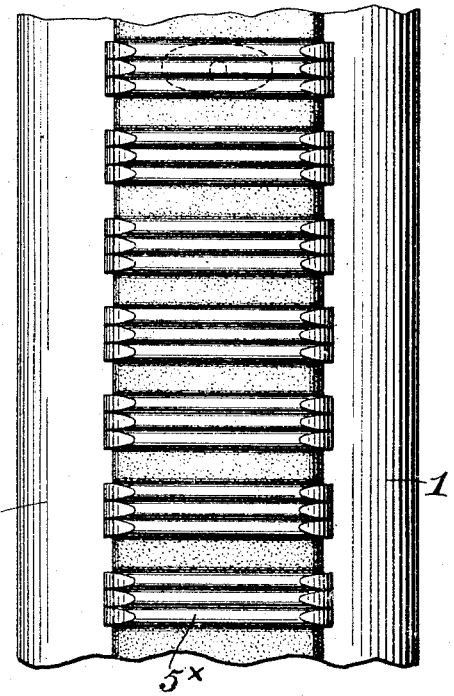
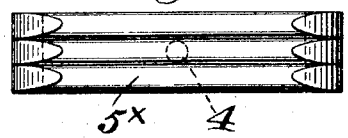
Inventor
Richard W. Goodhart,

UNITED STATES PATENT OFFICE.

RICHARD W. GOODHART, OF PENSACOLA, FLORIDA.

SECTIONAL PNEUMATIC TIRE.

1,364,930. Specification of Letters Patent. Patented Jan. 11, 1921.

Application filed March 1, 1920. Serial No. 362,201.

*To all whom it may concern:*

Be it known that I, RICHARD W. GOODHART, a citizen of the United States, and a resident of Pensacola, in the county of Escambia and State of Florida, have invented certain new and useful Improvements in Sectional Pneumatic Tires, of which the following is a specification.

My said invention relates more particularly to what are known as outer shoes or casings of pneumatic tires, and one object of the invention is to provide such a shoe or casing with a removable tread portion which may be readily replaced when worn.
Another object is to provide such a tread having an efficient non-skid surface. A further object is to construct the tire in such a manner that it may be economically and expeditiously manufactured, and will be strong and durable in use.

With these and other objects in view, the invention includes the novel features of construction and arrangement and combination of parts hereinafter described and particularly defined by the appended claims.

In order that my invention may be more readily understood I have illustrated several embodiments thereof in the accompanying drawings, in which:—

Figure 1 shows a portion of a tire in side elevation, and partly in section.

Fig. 2 is a transverse section of the same, on line 2—2.

Figs. 3, 4, and 5 are details of one of the anti-skid tread members.

Fig. 6 is a view of one of the fastening staples.

Fig. 7 shows a portion of a tire in side elevation, and partly broken away, illustrating a slightly modified form.

Fig. 8 is a transverse section of the form shown in Fig. 7, on line 7—7.

Fig. 9 shows a tread portion of the tire illustrated in Fig. 7, and Fig. 10 is a side view of one of the anti-skid members used, in modified form.

Fig. 11 is a plan view of the same.

Referring by reference characters to these drawings and first to the form shown in sheet 1 thereof, the numerals 1, 1 designate the side walls of the tire which may be constructed of the ordinary tire material and have the usual rim engaging edges $1^a$ which are shown, for example, as of the straight side type adapted for the "quick detachable" form of rim. The opposite or outer edges $1^b$ are of a similar shape and are designed to abut against the opposite sides of the filling ring or strip 2 which is of annular form and which may be made of rubber or any suitable resilient material. The edges $1^b$ of the side sections are embraced between the opposite edges or sides of the filling ring and the upwardly extending side flanges $5^a$ of the anti-skid tread members 5 which are in the shape of cross bars having suitably corrugated outer faces as indicated at $5^b$. Wear strips 3 may be interposed between the flanges $5^a$ and the outer faces of the tire edges if desired, to prevent cutting the tire sections and the said flanges $5^a$ are preferably slightly flared to facilitate assembly. The anti-skid tread members or bars are secured in position or anchored to the filling strip 2 by means of studs or rivets 4 which are preferably formed integral with the tread members, and the upper ends are designed to be headed over or upset upon the washers 6 which are countersunk into the inner surface of the filling strip. A protecting layer or layers of fabric 7 may be provided over the entire inner surface of the filling strip 2 to prevent injury to the inner tube from the ends of the studs and the washers.

To fill up the spaces between the non-skid bars and make a comparatively even tread, I interpose between the tread bars 5 and the outer face of the filling ring and tire edges an annular band 8 of rubber or similar material having molded or formed integral therewith transverse projections or ribs $8^a$ which lie between the tread bars and fill the spaces therebetween, said ribs being of a sufficiently yielding nature so as to not interfere with the non-skid effect of the bars or members 5.

To further secure the tread parts firmly together, I provide alining openings through the flanges, tire edges and filling ring through which I pass staples 9, the ends of which may be clenched over as indicated at $9^a$ to secure them in place.

The shoe or casing above described is particularly adapted for large sized tires.

For smaller tires I may use the construction shown in Figs. 7 and 8. In this form, I make the outer edges $1^x$ of the tire sections 1 of the so-called clencher type or shape and I provide the non-skid bars 5ˣ with hook shaped ends designed to hook over or engage the beaded edges 1ˣ, no other fastening means being required.

In this form I have shown the non-skid bars as provided with corrugations which extend lengthwise of the bars and hence crosswise of the tire, but it will be obvious that any form of non-slipping corrugation may be used as desired.

Having thus described my invention, what I claim is:

1. A sectional tire comprising a pair of side sections, a filling ring between the outer edges of said sections, a plurality of transversely disposed metal bars having inwardly turned ends engaging the outer faces of the outer edges of said side sections, said bars being spaced from each other, an annular ring interposed between said bars and the section edges and filling ring, said annular ring having ribs filling the spaces between said metal bars.

2. A sectional tire comprising a pair of side sections, a filling ring between the outer edges of said sections, a plurality of transversely disposed tread members having end portions embracing the outer edges of said tire sections, intermediate tread members held in place by the transversely disposed tread members, and studs carried by the first mentioned tread members and secured to said filling ring.

3. A sectional tire comprising a pair of side sections, a filling ring between the outer edges of said sections, a plurality of transversely disposed metal bars having inwardly turned ends engaging the outer faces of the edges of said sections and resilient spacing members between the bars provided with portions which underlie the metal bars.

In testimony whereof I affix my signature.

RICHARD W. GOODHART.